United States Patent
Schulz et al.

(10) Patent No.: US 12,152,099 B2
(45) Date of Patent: Nov. 26, 2024

(54) POLYACRYLATE GRAFT RUBBER COPOLYMER AND IMPACT MODIFIED THERMOPLASTIC MOLDING COMPOSITION

(71) Applicant: INEOS STYROLUTION GROUP GMBH, Frankfurt am Main (DE)

(72) Inventors: Tobias Schulz, Cologne (DE); Wolfgang Fischer, Heidelberg (DE); Norbert Niessner, Friedelsheim (DE); Christian Ruthard, Mainz (DE); Hannes Kerschbaumer, Bad Soden am Taunus (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 772 days.

(21) Appl. No.: 17/262,018

(22) PCT Filed: Jul. 22, 2019

(86) PCT No.: PCT/EP2019/069693
§ 371 (c)(1),
(2) Date: Jan. 21, 2021

(87) PCT Pub. No.: WO2020/020831
PCT Pub. Date: Jan. 30, 2020

(65) Prior Publication Data
US 2021/0292459 A1  Sep. 23, 2021

(30) Foreign Application Priority Data
Jul. 24, 2018 (EP) .................................. 18185186

(51) Int. Cl.
| | | |
|---|---|---|
| C08F 257/02 | (2006.01) | |
| C08F 2/22 | (2006.01) | |
| C08F 212/08 | (2006.01) | |
| C08F 220/44 | (2006.01) | |
| C08F 265/06 | (2006.01) | |
| C08L 25/12 | (2006.01) | |
| C08L 33/20 | (2006.01) | |
| C08L 51/04 | (2006.01) | |

(52) U.S. Cl.
CPC .............. *C08F 257/02* (2013.01); *C08F 2/22* (2013.01); *C08F 212/08* (2013.01); *C08F 220/44* (2013.01); *C08F 265/06* (2013.01); *C08L 25/12* (2013.01); *C08L 33/20* (2013.01); *C08L 51/04* (2013.01); *C08L 2207/53* (2013.01)

(58) Field of Classification Search
CPC ........ C08F 257/02; C08F 265/22; C08F 2/22; C08F 212/08; C08F 220/44; C08L 33/20; C08L 25/12; C08L 51/04; C08L 2207/53
See application file for complete search history.

(56) References Cited

U.S. PATENT DOCUMENTS

| | | |
|---|---|---|
| 2,520,959 A | 9/1950 | Powers |
| 3,530,094 A | 9/1970 | Schnell et al. |
| 3,535,280 A | 10/1970 | Schnell et al. |
| 4,224,419 A | 9/1980 | Swoboda et al. |
| 4,537,949 A | 8/1985 | Schmidt et al. |
| 4,540,772 A | 9/1985 | Pipper et al. |
| 4,634,734 A | 1/1987 | Hambrecht et al. |
| 4,788,253 A | 11/1988 | Hambrecht et al. |
| 5,196,480 A | 3/1993 | Seitz et al. |
| 6,066,693 A | 5/2000 | Fischer et al. |
| 6,111,012 A | 8/2000 | Fischer et al. |
| 6,323,279 B1 | 11/2001 | Guntherberg et al. |
| 6,774,167 B1 | 8/2004 | Oepen et al. |
| 2002/0082374 A1 | 6/2002 | Schaedler et al. |
| 2002/0111435 A1 | 8/2002 | Gasche et al. |
| 2003/0181583 A1 | 9/2003 | Duijzings et al. |
| 2004/0192846 A1 | 9/2004 | Oepen et al. |
| 2011/0275763 A1 | 11/2011 | Niessner et al. |
| 2016/0297957 A1 | 10/2016 | Boeckmann et al. |

FOREIGN PATENT DOCUMENTS

| | | |
|---|---|---|
| CN | 103910959 A | 7/2014 |
| DE | 1233131 B | 1/1967 |
| DE | 1258076 B | 1/1968 |
| DE | 1495730 A1 | 4/1969 |
| DE | 1300266 B | 7/1969 |
| DE | 2101650 A1 | 7/1971 |
| DE | 3149358 A1 | 6/1983 |
| DE | 3227555 A1 | 1/1984 |
| DE | 19610897 A1 | 9/1997 |

(Continued)

OTHER PUBLICATIONS

Lange, Kolloid-Zeitschrift und Zeitschrift für Polymere, Band 223, Heft 1. see specification for relevancy at p. 3, lines 24-25.

(Continued)

*Primary Examiner* — Patrick D Niland
(74) *Attorney, Agent, or Firm* — RAPHAEL BELLUM PLLC

(57) ABSTRACT

Polyacrylate graft rubber copolymer B and an impact modified thermoplastic molding composition thereof, where the graft copolymer B is composed of: B1: 50 to 70 wt.-% crosslinked acrylate polymer graft base B1 B2: 30 to 50 wt.-% graft shell B2 comprising a first layer B21 of vinylaromatic monomers, and a second layer B22 of vinylaromatic monomers B21-1 and nitrile monomers B22-2: wherein the particle diameter dw of the graft base Bl is 255 to 290 nm; the fraction of B21 is 10 to 26 wt.-%; and the amount of B22-2, is 20 to 30 wt.-%.

18 Claims, No Drawings

(56) References Cited

FOREIGN PATENT DOCUMENTS

| | | |
|---|---|---|
| EP | 0006503 A1 | 1/1980 |
| EP | 0007810 A2 | 2/1980 |
| EP | 0029613 A1 | 6/1981 |
| EP | 0038094 A2 | 10/1981 |
| EP | 0038582 A2 | 10/1981 |
| EP | 0039524 A1 | 11/1981 |
| EP | 0129195 A2 | 12/1984 |
| EP | 0129196 A2 | 12/1984 |
| EP | 0450485 A2 | 10/1991 |
| EP | 0993476 B1 | 4/2000 |
| EP | 1191044 A2 | 3/2002 |
| EP | 1305345 B1 | 10/2004 |
| GB | 976212 A | 11/1964 |
| GB | 976214 A | 11/1964 |
| GB | 1039727 A | 8/1966 |
| GB | 1319784 A | 6/1973 |
| KR | 1019990028439 A | 4/1999 |
| KR | 20130090732 A | 8/2013 |
| KR | 20150037378 A | 4/2015 |
| WO | 01/30901 A1 | 5/2001 |
| WO | 02/28931 A1 | 4/2002 |
| WO | 2007/142473 A1 | 12/2007 |

OTHER PUBLICATIONS

Scholtan, H. Lange, Kolloid-Z. u. Z. Polymere 250, p. 782-796, 1972. see specification for relevancy at p. 3, lines 26-27.

W. Wohlleben, H. Schuch, "Measurement of particle size distribution of polymer latexes", p. 130-153. see specification for relevancy at p. 3, lines 28-29.

POLYACRYLATE GRAFT RUBBER COPOLYMER AND IMPACT MODIFIED THERMOPLASTIC MOLDING COMPOSITION

The present invention relates to a thermoplastic molding composition having excellent impact strength which comprises at least one copolymer component made of styrene monomers and nitrile monomers, and also at least one graft copolymer based on an acrylate rubber, and also to shaped articles produced therefrom, and use thereof. The invention further relates to an acrylate graft copolymer which is used as an impact modifier in said composition.

The production of poly-(styrene-co-acrylonitrile) resins is well known to a skilled person and e.g. described in Kunststoff-Handbuch [Plastics handbook] (Vieweg-Daumiller, Vol. V Polystyrol [Polystyrene], Carl-Hanser-Verlag, Munich, 1969, p 124, lines 12 ff.). Polyacrylate based graft rubber copolymers are also well known in the art as impact modifi-ers for poly-(styrene-co-acrylonitrile) thermoplastic polymers.

DE-A 3149358 describes impact modified styrene-acrylonitrile (SAN) copolymer molding compositions. The impact modifier is a graft copolymer B composed of a polyacrylate graft base B1, a first graft shell B21 of a vinylaromatic polymer and a second graft shell B22 of a SAN copolymer. The weight average particle diameter of the graft base B1 is 200 to 500 nm, preferably 250 to 450 nm (examples 216 nm, 410 nm) and the fraction of the graft shell B21—based on the entire graft shell B21 and B22—is 30 to 70 wt.-% (example 50 wt.-%).

EP-A 0450485 discloses molding compositions comprising a SAN matrix copolymer C, a first graft copolymer A composed of a crosslinked acrylate polymer as the graft base A1 (mean particle diameter of 50 to 150 nm) and a graft shell A2 of a SAN-copolymer, and a second graft copolymer B composed of a crosslinked acrylate polymer as the graft base B1 with a mean particle diameter of 200 to 700 nm, preferably 250 to 500 nm (example 410 nm), and a first graft shell B21 of a vinylaromatic copolymer and a second graft shell B22 of a SAN-copolymer. The fraction of the first graft shell B21—based on B21 and B22—is 50 wt.-% (examples).

WO 2007/142473 describes acrylate-styrene-acrylonitrile graft copolymers (ASA) and use thereof in molding compositions of SAN copolymers. The ASA graft copolymer includes: a double layered rubbery polymer comprising an inner core layer of alkylacry-late-vinyl aromatic copolymer and an outer core layer of alkylacrylate polymer; and a vinyl aromatic-unsaturated nitrile copolymer shell layer grafted onto the double layered rubbery polymer. The rubbery polymer (butylacrylate-styrene latex) has an average particle size of 100 to 300 nm.

US 2011/0275763 describes the production of impact resistant molding compositions comprising a SAN matrix copolymer and acrylate graft rubber copolymers (B) and (C) of different particle size. The graft copolymers (B) or (C) are composed of a graft base b1) or c1) and a first graft shell consisting of a vinylaromatic homopolymer and a second graft shell b2) or c2) made from a SAN copolymer. The average particle size d50 of the graft base b1) is 50 to 170 nm; the d50 value of graft base c1) is 300 to 600 nm, preferably 350 to 580 nm.

US 2016/0297957 discloses thermoplastic molding compositions comprising a SAN-matrix copolymer A, a graft copolymer B consisting of a crosslinked polyacrylate graft base B1, a first graft shell B21 of a vinylaromatic polymer and a second graft shell B22 of a SAN copolymer. The weight average particle diameter of the graft base B1 is 300 to 700 nm (example 450 nm). The fraction of the first graft shell B21—based on B21 and B22—is 50 wt.-% (examples). The composition optionally comprises a small particle-d50 80-200 nm-graft copolymer B' having only one graft shell.

However, there is always a need for improved impact strength of molding compositions comprising Acrylonitrile-Styrene-Acrylate (ASA) graft copolymers.

It is one object of the invention to provide a thermoplastic molding composition, in particular based on SAN-copolymers, having improved mechanical properties, in particular an improved impact strength. A further object of the invention is to provide an improved impact modifier based on an acrylate graft copolymer.

It was surprisingly found that the afore-mentioned objects can be solved by a graft copolymer based on an acrylate rubber having an optimized medium particle size and a graft shell of a specific constitution.

One subject of the present invention is a graft copolymer B composed of:
B1: 50 to 70 wt.-%, preferably 55 to 65 wt.-%, based on B, of at least one graft base B1 obtained by emulsion polymerization of the following monomers:
  b11: 70 to 99.9 wt.-%, preferably 75 to 99.5 wt.-%, more preferably 87.5 to 99 wt.-% of at least one acrylate;
  b12: 0 to 29.9 wt %, preferably 0 to 20 wt.-%, more preferably 0 to 10 wt.-%, of at least one further comonomer selected from: styrene, α-methylstyrene, acrylonitrile, methacrylonitrile, methylmethacrylate, and N-phenylmaleimide (N-PMI);
  b13: 0.1 to 10 wt.-%, preferably 0.5 to 5 wt.-%, more preferably 1 to 2.5 wt.-%, based on B1, of one or more bi- or polyfunctional, crosslinking monomers;
  where the sum of b11, b12 and b13 adds up to 100 wt.-%;
B2: 30 to 50 wt.-%, preferably 35 to 45 wt.-%, based on B, of a graft shell B2, which is obtained via emulsion polymerization in the presence of at least one graft base B1, where the graft shell B2 comprises (consists of) a first layer B21 made of at least one vinylaromatic monomer, and a second layer B22 made of a mixture comprising (consisting of) at least one vinylaromatic monomer B21-1 and at least one nitrile monomer B22-2;
where the sum of B1 and B2 adds up to 100 wt.-%; characterized in that:
i. the weight average particle diameter $d_w$ of the graft base B1 is in the range of from 255 to 290 nm, preferably 260 to 285 nm, more preferably 265 to 280 nm;
ii. the fraction of B21—based on the total amount of B2—is 10 to 26 wt.-%, preferably 12 to 22 wt.-%, more preferably 13 to 17 wt.-%, most preferred 14 to 16 wt.-%; and
iii. the amount of B22-2, based on the total amount of B22, is 20 to 30 wt.-%, preferably 24 to 26 wt.-%.

In the present application, the weight-average particle diameter $d_W$ is determined by turbidity measurement as described in Lange, Kolloid-Zeitschrift und Zeitschrift für Polymere, Band 223, Heft 1. Further suitable methods for the measurement of the weight-average particle diameter $d_W$ are ultracentrifugation (e.g. described in Scholtan, H. Lange, Kolloid-Z. u. Z. Polymere 250, S. 782-796, 1972) or using Hydrodynamic Chromatography HDC (e.g. described in W. Wohlleben, H. Schuch, "Measurement of Particle Size Di. Vega, p. 130-153).

Wt.-% means % by weight.

Graft Copolymer B

Preferably graft copolymer B according to the invention is composed of

B1: 50 to 70 wt.-%, preferably 55 to 65 wt.-%, based on B, of graft base B1; and B2: 30 to 50 wt.-%, preferably 35 to 45 wt.-%, based on B, of a graft shell B2, wherein:
  i. the weight average particle diameter of the graft base B1 is in the range of from 260 to 285 nm, preferably 265 to 280 nm;
  ii. the fraction of B21—based on the total amount of B2—is 10 to 26 wt.-%, preferably 12 to 22 wt.-%, more preferably 13 to 17 wt.-%, most preferred 14 to 16 wt.-%; and
  iii. the amount of B22-2, based on the total amount of B22, is 20 to 30 wt.-%, preferably 24 to 26 wt.-%.

More preferably graft copolymer B according to the invention is composed of

B1: 55 to 65 wt.-%, based on B, of graft base B1; and

B2: 35 to 45 wt.-%, based on B, of a graft shell B2, wherein:
  i. the weight average particle diameter $d_w$ of the graft base B1 is in the range of from 260 to 285 nm, preferably 265 to 280 nm;
  ii. the fraction of B21—based on the total amount of B2—is 12 to 22 wt.-%, preferably 13 to 17 wt.-%, more preferred 14 to 16 wt.-%; and
  iii. the amount of B22-2, based on the total amount of B22, is 20 to 30 wt.-%, preferably 24 to 26 wt.-%.

The weight average particle diameter of graft copolymer B is often from 290 to 340 nm.

Graft Base B1

The graft base B1 generally has a glass transition temperature Tg below 0° C. The glass transition temperature Tg can be determined using the DSC according DIN EN ISO 11358-1:2014 (heating rate 5 K/min).

The acrylate monomer b11 of the graft base B1 is generally at least one C2-C8-alkyl acrylate, preferably C2-C4-alkyl acrylate.

The alcohol component of the C2-C8-alkyl acrylate can be of linear or branched structure, a linear structure is preferred.

Particularly suitable are ethyl acrylate, 2-ethylhexyl acrylate, and n-butyl acrylate. Preference is given to 2-ethylhexyl acrylate and n-butyl acrylate, and very particular preference is given to n-butyl acrylate. It is also possible to use a mixture of various C2-C8-alkylacrylates differing in their alkyl radical. Preferably one C2-C8-alkyl acrylate, more preferably one C2-C4-alkyl acrylate, most preferably n-butyl acrylate is used.

The rubbery graft base B1 moreover comprises at least one crosslinking monomer b13. Such monomers are bi- or polyfunctional comonomers having at least two olefinic double bonds, preferably bifunctional comonomers having two olefinic double bonds, examples being divinyl esters of dicarboxylic acids, for example of succinic acid and of adipic acid, diallyl and divinyl ethers of bifunctional alcohols, for example of ethylene glycol and of butane-1,4-diol, diesters of acrylic acid and methacrylic acid with the bifunctional alcohols mentioned, 1,4-divinylbenzene, and triallyl cyanurate. Particular preference is given to the acrylic ester of tricyclodecenyl alcohol which is known as dihydrodicyclopentadienyl acrylate (DCPA), and also to the allyl esters of acrylic and methacrylic acid, in particular allyl methacrylate (AMA). DCPA is most preferably used.

The crosslinking comonomer is used in amounts of from 0.1 to 10 wt.-%, preferably 0.5 to 5 wt.-%, more preferably 1 to 2.5 wt.-%, based on B1. By way of example, from 1 to 2.5 wt.-%, preferably 1.5 to 2.1 wt.-% of DCPA or allyl methacrylate are used. It is possible to use two crosslinking agents, but preferable to use only one.

The rubbery graft base B1 may comprise 0 to 29.9 wt %, preferably 0 to 20 wt.-%, more preferably 0 to 10 wt.-%, of at least one further comonomer b12 selected from: styrene, α-methylstyrene, acrylonitrile, methacrylonitrile, methylmethacrylate, and N-phenylmaleimide (N-PMI).

If comonomer b12 is present its minimum amount is 0.1 wt.-%, based on B1.

Preferably comonomer b12 is not present in graft base B1.

The weight average particle diameter $d_w$ of the graft base B1 is in the range of from 255 to 290 nm, preferably 260 to 285 nm, more preferably 265 to 280 nm.

Preferably the swelling index of the graft base B1 is from 7 to 14, particularly preferably from 9 to 12. The swelling index is a measure of the ability of a solvent to swell a polymer. An example of a conventional swelling agent is methyl ethyl ketone or toluene. By way of example, the swelling index is determined by a method in which about 0.2 g of the solid in a graft-base dispersion converted to a film via evaporation of the water is swollen in an amount of toluene, e.g. 50 g. The toluene is removed by suction after, for example, 24 hours, and the specimen is weighed. The specimen is again weighed after it has been dried in vacuo. The swelling index is the ratio of the weight after the swelling procedure to the dry weight after final drying.

Graft Shell B2

Preferably graft shell B2 consists of a first layer B21 and a second layer B22.

First Layer B21

Monomers suitable for the production of the first layer B21 are vinylaromatic monomers such as styrene and/or styrene derivatives, for example alkylstyrene, preferably α-methylstyrene, and ring-alkylated styrenes, for example p-methylstyrene and/or tert-butylstyrene. It is preferable to use styrene.

The fraction of B21—based on B2—is 10 to 26 wt.-%, preferably 12 to 22 wt.-%, more preferably 13 to 17 wt.-%, most preferred 14 to 16 wt.-%.

Second Layer B22

Examples of the nitrile monomers B22-2 that are used in the second layer B22 of graft shell B2 are acrylonitrile and methacrylonitrile. Preference is given to acrylonitrile. As vinyl aromatic monomers B22-1 in the second layer the monomers as described above for the first layer can be used. Preferably styrene and/or α-methylstyrene, more preferably styrene, are used in addition to the afore-mentioned nitrile monomers B22-2.

It being possible for vinyl aromatic monomers B22-1, in particular styrene, and/or nitrile monomers B22-2, in particular acrylonitrile, to be replaced partially (up to 30 wt.-%, preferably up to 20 wt.-%, more preferably up to 15 wt.-%) by other copolymerizable monomers such as methyl methacrylate, N-phenylmaleimide and maleic anhydride, preference is given to methyl methacrylate and/or maleic anhydride.

The use of no other copolymerizable monomer in layer B22 is preferred.

It is preferable that the second layer B22 is a copolymer of styrene and acrylonitrile. The amount of the nitrile monomer B22-2, based on the total amount of B22, is 20 to 30 wt.-%, preferably 24 to 26 wt.-%.

One further subject of the invention is a process for the preparation of the graft copolymer B according to the invention.

Process for the Preparation of the Graft Copolymer B

The graft copolymers B according to the invention are produced via aqueous free-radical emulsion polymerization preferably in the presence of a seed polymer latex (S-B1). The use and the preparation of a seed polymer latex by free-radical-initiated aqueous emulsion polymerization is known (cp. U.S. Pat. No. 2,520,959).

The seed polymer latex (S-B1) is a starting rubber latex having a weight average particle diameter dw of below that of the particles of the final graft base B1. The size of the particles of polymer may vary over a wide range. Often the starting rubber latex has a weight average particle diameter $d_w$ of less than 120 nm, more often less than 100 nm, preferably less than 90 nm, more preferably in the range of 50 to 85 nm, most preferred 60 to 85 nm.

The polymer used as "seed" need not to be identical in composition with the polymer present in the final rubber latex (graft base B1), but it should be selected from the same class of polymers. Preferably the starting rubber latex is a crosslinked acrylate rubber latex, more preferably a crosslinked butylacrylate rubber latex.

The seed polymer latex (S-B1) is generally used in amounts of from 0.01 to 3 wt.-%, frequently from 0.03 to 2 wt.-%, and often from 0.04 to 1.5 wt.-%, based on the total amount of monomer used for the preparation of graft base B1. By use of such a seed polymer latex a controlled setting of the particle size of the polymer particles can be achieved.

The production of graft copolymers from an elastomeric ASA graft base and a graft shell is well known (see US 2011/0275763). Graft copolymers can be produced by grafting in a plurality of stages (see US 2011/0275763 and US 2016/0297957).

For the production process for the graft copolymers B the general procedure is that the graft base B1 is first produced in presence of a seed polymer latex (S-B1) by emulsion polymerization, by polymerizing a C2-C8-alkyl acrylate b11 (e.g. butyl acrylate) and optionally a comonomer b12 and a crosslinking monomer b13 (e.g. DCPA or AMA) in an aqueous emulsion with a free-radical initiator (e.g. potassium persulfate) at temperatures of from 30° to 120° C., preferably from 40 to 100° C., more preferably 50 to 80° C.

On this resultant basic rubber latex (=graft base B1) then, in aqueous emulsion, in a first graft reaction a first layer B21 of graft shell B2 is prepared by addition and polymerization of a vinyl aromatic monomer (e.g styrene), and then, in a second graft reaction a second layer B22 of graft shell B2 is prepared by addition and polymerization of monomers B22-1 (e.g. styrene) and B22-2 (e.g. acrylonitrile).

The materials can be introduced in form of a mixture, for example in the form of aqueous monomer emulsion.

If in one step of the production process two or more monomers are added, the monomers can be added individually or in mixtures with one another. Preferably the individual monomers are added simultaneously or in a mixture with one another.

To produce the graft polymer B it is preferable to use an inorganic peroxide salt, preferably inorganic persulfate salt, more preferably potassium peroxodisulfate, as free-radical initiator. It is also possible to use sodium peroxodisulfate and/or ammonium peroxodisulfate. It is also possible to use a redox initiator system, in particular comprising an organic peroxide and at least one reducing agent.

Suitable organic peroxides are those selected from the following group: di-tert-butyl peroxide, cumene hydroperoxide, tert-butyl hydroperoxide, and p-menthane hydroperoxide, and mixtures thereof. The reducing agent used generally comprises at least one water-soluble compound which has reducing action and has been selected from the following group: salts of sulfinic acid, salts of sulfurous acid, sodium dithionite, sodium sulfite, sodium hyposulfite, sodium hydrogensulfite, ascorbic acid, and salts thereof, Rongalit C (sodium formaldehyde-sulfoxylate), mono- and dihydroxyacetone, sugars, iron(II) salts, tin(II) salts, and titanium(III) salts.

The amount of the free-radical initiator used, based on the total amount of monomer, is generally from 0.01 to 5% by weight, preferably from 0.1 to 3% by weight, and particularly preferably from 0.2 to 1.5% by weight.

The graft polymer (B) can be produced by emulsion polymerization, with use of a redox initiator system comprising cumene hydroperoxide, dextrose, and iron(III) salt, or with use of a peroxide, such as potassium peroxodisulfate.

The graft base B1 is produced via free-radical-initiated aqueous emulsion polymerization as hereinbefore described in presence of a seed polymer latex (S-B1), by adding the monomers within the aqueous reaction medium after initiation of the free-radical polymerization reaction. In another possible method, at least one portion of the free-radical polymerization initiator and optionally of other auxiliaries is used as initial charge in the aqueous reaction medium, the resultant aqueous reaction medium is brought to polymerization temperature, and, at that temperature, the monomers are added to the aqueous reaction medium.

In one preferred embodiment of the invention, a peroxodisulfate, in particular potassium peroxodisulfate, is used as free-radical initiator, in conjunction with other auxiliary components, when producing the graft base B1. It is possible inter alia to use a buffer (such as bicarbonate), and potassium stearate. Preferably an alkansulfonate sodium salt (commercially available as Mersolat® H95 or K30 from Lanxess) is used as soap (emulsifier).

By way of example, tert-dodecyl mercaptan can be used as molecular-weight regulator, and can be added continuously or else at various junctures during the process to produce the rubber latex. The manner of addition of the regulator can have an effect on the properties of the final product. One preferred embodiment uses no regulator.

For the purposes of the polymerization process described, dispersing agents (DM) are also used, and these maintain dispersion not only of the monomer droplets but also of the polymer particles formed, within the aqueous medium, and thus ensure that the resultant aqueous polymer dispersion is stable. Dispersing agents (DM) that can be used are not only the protective colloids conventionally used in carrying out free-radical aqueous emulsion polymerizations but also commercially available emulsifiers. Examples of suitable protective colloids are polyvinyl alcohols, polyalkylene glycols, alkali metal salts of polyacrylic acids and polymethacrylic acids, and gelatin derivatives. Examples of suitable protective colloids are copolymers comprising the following: acrylic acid, methacrylic acid, maleic anhydride, 2-acrylamido-2-methylpropanesulfonic acid, and/or 4-styrenesulfonic acid, and alkali metal salts of those copolymers.

Other suitable protective colloids are homo- and copolymers comprising the following: N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, aminated acrylates, methacrylates, acrylamides, and/or methacrylamides.

There is also a detailed description of other suitable protective colloids in Houben-Weyl, "Methoden der organischen Chemie" [Methods of Organic Chemistry], volume XIV/1, Makromolekulare Stoffe [Macromolecular materials], Georg-Thieme-Verlag, Stuttgart, 1961, pages 411 to 420.

It is also possible to use mixtures of protective colloids and/or emulsifiers. The dispersing agents used frequently comprise exclusively emulsifiers, where the relative molecular weights of these, unlike those of the protective colloids, are usually below 1000. They can be either anionic, cationic, or nonionic. If a mixture of surfactant substances is used, the individual components should be mutually compatible. Anionic emulsifiers are generally compatible with one another and with nonionic emulsifiers.

The same also applies to cationic emulsifiers, whereas anionic and cationic emulsifiers should mostly not be combined with one another. An overview of suitable emulsifiers is found in Houben-Weyl, "Methoden der organischen Chemie", volume XIV/1, Makromolekulare Stoffe, Georg-Thieme-Verlag, Stuttgart, 1961, pages 192 to 208. Particular dispersing agents used in the invention are emulsifiers, such as anionic, cationic, or nonionic surfactants. Examples of familiar nonionic emulsifiers are oxylated mono-, di-and trialkylphenols, and also ethoxylated fatty alcohols.

Examples of conventional anionic emulsifiers are the alkali metal and ammonium salts of alkyl sulfates (having C8-C12-alkyl radicals), of sulfuric acid hemiesters of ethoxylated alkanols (alkyl radical: C12-C18), and of ethoxylated alkylphenols (alkyl radicals: C4-C12), and of alkylsulfonic acids (alkyl radical: C12-C18). Preferred alkali metal salts of alkylsulfonic acids are alkansulfonate sodium salts which are commercially available as Mersolat® H95 or K30 from Lanxess.

Suitable cationic emulsifiers are inter alia phosphonium salts, sulfonium salts, tropylium salts, morpholinium salts, oxazolinium salts, imidazolinium salts, pyridinium salts, and primary, secondary, tertiary, or quaternary ammonium salts having C8-C18-alkyl, alkylaryl, or heterocyclic radicals. Examples of compounds are inter alia N-laurylpyridinium sulfate, N-cetylpyridinium sulfate, dodecylammonium acetate or the corresponding sulfate, and disulfates or acetates of the various paraffinic esters that involve 2-(N,N,N-trimethylammonium)ethyl radicals. The emulsifiers and protective colloids can also be used in the form of mixtures.

The total amount used of the emulsifiers preferred for use as dispersing agents is advantageously from 0.005 to 5% by weight, preferably from 0.01 to 5% by weight, in particular from 0.1 to 3% by weight, based in each case on the total concentration of monomer. The total amount of the protective colloids used as dispersing agents in addition to or instead of the emulsifiers is often from 0.1 to 10% by weight, and frequently from 0.2 to 7% by weight, based in each case on the total monomer concentration. However, the dispersing agents used preferably comprise anionic and/or nonionic emulsifiers and particularly preferably comprise anionic emulsifiers.

Other polymerization auxiliaries that can be used during the polymerization reaction are the conventional buffer substances, which can adjust to pH values which are preferably from 6 to 11, examples being sodium bicarbonate and sodium pyrophosphate, and also from 0 to 3% by weight of a molecular-weight regulator, e.g. mercaptans, terpineols, or dimeric α-methylstyrene. The buffer substances can also have a complexing action.

The polymerization reaction can be carried out in the range from 20 to 170° C. Temperatures used are generally from 30 to 120° C., preferably 40 to 100° C., more preferably from 50 to 80° C.

The polymers (B1) produced in the manner described above are suitable as graft base for producing the graft copolymers (B).

An important parameter for graft copolymers is the graft yield, which is 100% in the case of complete grafting. Graft copolymers with maximum graft yield are advantageous for many applications, since these comprise only small amounts of free polymer derived from the monomers. The polymer not bound to the rubber can have an adverse effect on the physical properties of the copolymer, and this is particularly noticeable in mixtures with other components.

The graft shell (B2) is produced via an emulsion polymerization process, optionally after agglomeration. The graft shell (B2) is polymerized in the presence of the graft base (B1) obtained by the process described above. It is advantageous that this graft copolymerization reaction is again carried out in aqueous emulsion, under the conventional conditions described above, and the use of a redox initiator system has proven successful here.

The system in which the graft copolymerization reaction takes place to produce the graft shell (B2) can be the same as that used for the emulsion polymerization reaction to produce the graft base (B1), and it is possible here, if necessary, to add further emulsifiers, and also auxiliaries. The monomers to be grafted onto the graft base are added to the reaction mixture in at least two steps, preferably two steps, as described above in order to construct a graft shell B2 comprising at least two graft layers B21 and B22, preferably a graft shell B2 composed of two graft layers B21 and B22.

The degree of grafting (DG) is the amount of the graft monomers used divided by the total sum of the monomers (graft base monomers and graft monomers) used for the graft copolymer.

The graft copolymerization of the mixture of components present in the graft shell and optionally of further monomers, in the presence of the graft base (B1) is carried out in such a way as to give a degree of grafting of from 30 to 50 wt.-%, preferably 35 to 45 wt.-%. Since the graft yield (GY) is generally not 100%, the portion of the polymers actually grafted onto the material is smaller than the amount used. It follows from this that some free polymers are produced. One of the possible ways of controlling the graft yield during the graft polymerization reaction uses the metering rate of the monomers, or uses variables relating to the addition of initiator and of regulator. By way of example, addition of a larger amount of regulator (e.g. mercaptans) leads to a larger amount of free polymers.

The graft polymerization reaction can also be initiated by using graft-active and water-soluble redox systems. By way of example, conventional water-soluble initiators, e.g. potassium peroxodisulfate, sodium peroxodisulfate, ammonium peroxodisulfate, or hydrogen peroxide can be used together with at least one conventional reducing agent, e.g. sodium sulfite, sodium disulfite, sodium hydrogensulfite, sodium dithionite, ascorbic acid, sugar, or the sodium salt of hydroxymethanesulfonic acid, as redox system. In many instances, these redox systems give relatively large-particle dispersions. Particularly suitable redox catalysts with high graft activity are water-soluble initiator systems, e.g. redox systems made of hydrogen peroxide and heavy-metal ions, examples being the cerium salts, manganese salts, and iron(II) salts, as described by way of example in Houben-Weyl, "Methoden der organischen Chemie", 4th edition, volume E 20, p. 2168. Potassium peroxodisulfate is particularly suitable.

The conduct of the polymerization reaction can be such that the heavy-metal salt of the redox system, e.g. the iron(II) salt, is added to the mixture before the polymerization reaction begins, whereas the peroxide is metered in simultaneously with the monomers, but separately therefrom. Examples of concentrations used for the iron(II) salt are from 1 to 200 mg/l of Fe(II) ions, based on the entire dispersion, but higher and lower concentrations are also possible here.

There are various ways of introducing the redox initiator system, an example being addition in portions, as described in WO 2001/30901 or WO 2002/28931. The oxidant used preferably comprises cumene hydroperoxide (optionally in a mixture with cumene), where this is in particular introduced to some extent continuously and to some extent in portioned form (e.g. once).

Conventional initiators, such as oil-soluble or sparingly water-soluble organic peroxides or azo initiators can be used in addition to the redox initiators.

By way of example, it is advantageous to add further reducing agents, these preferably being used as initial charge with the iron salt prior to the polymerization reaction. Examples of reducing agents that can be used are sodium sulfite, sodium disulfite, sodium hydrogensulfite, sodium dithionite, ascorbic acid, reducing sugars, and also the sodium salt of hydroxymethanesulfonic acid.

The molecular weight of the grafted-on polymer can also be adjusted via concomitant use of chain-transfer agents or of molecular-weight regulators (MR), e.g. n-dodecyl mercaptan, tert-dodecyl mercaptan, n-butyl mercaptan, or tert-butyl mercaptan. Odor-free regulators are also suitable, an example being terpineols, see also EP-A 1 191 044.

The polymerization reaction is frequently carried out at pH values of from 2.5 to 12, preferably at pH values of from 8 to 11. The pH value can be adjusted to the desired value prior to or during the polymerization reaction by using conventional acids, such as hydrochloric acid, sulfuric acid, or acetic acid, or else by using bases, such as sodium hydroxide solution, potassium hydroxide solution, ammonia, or ammonium carbonate. It is preferable to adjust the pH value of the aqueous polymer dispersion to from 7 to 11 after the polymerization reaction, via addition of sodium hydroxide solution, potassium hydroxide solution, or ammonia.

Between production of the graft base (B1) and application of the graft shell (B2), an agglomeration step can be carried out, in order to achieve further controlled setting of particle sizes and particle size distributions. Various processes for partial or complete agglomeration of the graft base (B1) are known to the person skilled in the art, see by way of example EP-A 1 305 345, EP-A 029 613, EP-A 007 810, DE-A 12 33 131, DE-A 12 58 076 and DE-A 21 01 650.

In one preferred embodiment of the present invention, no agglomeration step is carried out.

Thermoplastic Molding Composition

One further aspect of the invention is a thermoplastic molding composition comprising a polymer mixture PM consisting of components A and B:
(A) 30 to 85 wt.-%, preferably 40 to 70 wt.-%, more preferably 55 to 65 wt.-%, of at least one thermoplastic copolymer A comprising (consisting of) at least one vinylaromatic monomer preferably styrene, A1, and at least one nitrile monomer, preferably acrylonitrile, A2;
(B) 15 to 70 wt.-%, preferably 30 to 60 wt.-%, more preferably 35 to 45 wt.-%, of at least one graft copolymer B as defined above;
where the sum of A and B adds up to 100 wt.-%.

In the thermoplastic molding composition of the invention, the fraction of the polymer mixture PM-consisting of components A and B—is generally 40 to 100 wt %, preferably 70 to 100 wt %, most preferably 80 to 100 wt %, based on the overall molding composition.

The thermoplastic molding composition of the invention may optionally further comprise at least one further graft copolymer C—different from graft copolymer B—composed of an elastomeric, crosslinked acrylate polymer C1 as graft base C1 and at least one graft shell C2 made of a mixture comprising (consisting of) vinylaromatic monomers C2-1 and nitrile monomers C2-2.

The fraction of the graft copolymer C is generally 0 to 30 wt %, preferably 0 to 20 wt %, based on the overall molding composition. If polymer C is present in the molding composition, its minimum fraction is customarily 0.1 wt %.

Furthermore, the molding composition of the invention may optionally comprise additives and/or auxiliaries D. The fraction of the additives and/or auxiliaries D is generally 0 to 20 wt.-%, preferably 0 to 10 wt %, based on the overall molding composition. If additives and/or auxiliaries C are present in the molding composition, their minimum fraction is customarily 0.1 wt %.

The thermoplastic molding composition of the invention may optionally further comprise at least one further thermoplastic polymer E selected from aromatic polycarbonates and polyamides. The fraction of the polymer E can be up to 50 wt %, often up to 30 wt.-%, preferably up to 20 wt.-%, more preferably up to 10 wt.-%, based on the overall molding composition. If polymer E is present in the molding composition, its minimum fraction is customarily 0.1 wt %.

Molding compositions comprising no thermoplastic polymers E are preferred. The sum of the polymer mixture PM—consisting of components A and B—and further optional components C, D and/or E present in the overall molding composition adds up to 100 wt %.

According to one embodiment of the invention the molding composition comprises (or consists of):
40 to 100 wt.-% of a polymer mixture PM consisting of components A and B as defined above;
0 to 30 wt.-% of at least one further graft copolymer C—different from graft copolymer B—composed of an elastomeric, crosslinked acrylate polymer C1 (=graft base C1) and at least one graft shell C2, which is obtained via emulsion polymerization in the presence of at least one graft base C1, which graft shell C2 is made of a mixture comprising at least one vinylaromatic monomer C2-1 and at least one nitrile monomer C2-2;
0 to 20 wt.-% of additives and/or auxiliaries D; and
0 to 50 wt.-% of at least one further thermoplastic polymer E selected from aromatic polycarbonates and polyamides;
based in each case on the overall molding composition, and where the sum of PM, and optional components C, D and/or E adds up to 100 wt %.

According to one further embodiment of the invention the afore-mentioned molding composition comprises (or consists of):
70 to 100 wt.-%, preferably 80 to 100 wt.-% of a polymer mixture PM;
0 to 30 wt.-%, preferably 0 to 20 wt.-%, of at least one further graft copolymer C;
0 to 10 wt.-%, preferably 0 to 5 wt.-%, of additives and/or auxiliaries D; and
0 to 30 wt.-%, preferably 0 to 20 wt.-%, of at least one further thermoplastic polymer E;

based in each case on the overall molding composition, and where the sum of PM, and optional components C, D and/or E adds up to 100 wt %.

Often molding compositions of the invention comprise (or consist of):
- 80 to 99.9 wt.-%, preferably 90 to 99.9 wt.-%, more preferably 95 to 99.5 wt.-%, of a polymer mixture PM consisting of components A and B as defined above; and
- 0.1 to 20 wt.-%, preferably 0.1 to 10 wt.-%, more preferably 0.5 to 5 wt.-%, of additives and/or auxiliaries D;

and based in each case on the overall molding composition, where the sum of PM, and component D adds up to 100 wt.-%.

Component A

The thermoplastic copolymer A is a rubber free resin. Amounts used of component A are from 30 to 85 wt.-%, preferably 40 to 70 wt.-%, more preferably 55 to 65 wt.-%. Suitable vinylaromatic monomers A1 are styrene and styrene derivatives such as α-methylstyrene and ring-alkylated styrenes, for example p-methylstyrene.

It is preferable to use styrene or α-methylstyrene, and in particular styrene. Preferred nitrile monomers A2 used are acrylonitrile and/or methacrylonitrile, preferably acrylonitrile.

The proportion of the vinylaromatic monomer (such as styrene) A1 in the copolymer A is generally from 65 to 75% by weight, preferably from 66 to 68% by weight, often about 67% by weight. The proportion of the nitrile monomer A2 in the copolymer A is generally from 20 to 35% by weight, preferably 25 to 35 wt.-%, more preferably from 30 to 34% by weight, often 32 to 34% by weight.

It being possible for vinylaromatic monomers A1, in particular styrene, and/or nitrile monomers A2, in particular acrylonitrile, to be replaced partially (up to 30 wt.-%, preferably up to 20 wt.-%, more preferably up to 15 wt.-%) by other copolymerizable monomers preferably such as methyl methacrylate, N-phenylmaleimide and/or maleic anhydride, preference is given to methyl methacrylate and/or maleic anhydride.

The molecular weight MW of copolymer A ranges preferably from 20,000 to 200,000 g/mol. The intrinsic viscosity [n] of the thermoplastic copolymer A is preferably from 20 to 110 ml/g (determined in DMF at 25° C.). The viscosity number VN of copolymer A is preferably from 50 to 100 $cm^3/g$, more preferably from 55 to 85 $g/cm^3$ (determined according to DIN 53726).

Copolymer A is preferably a copolymer of styrene and acrylonitrile. This SAN copolymer is often produced with (about) 67% by weight of styrene and (about) 33% by weight of AN. The molar mass of the SAN copolymer A is often in the range (Mw) from 120,000 to 180,000 g/mol, measured by conventional methods known to the person skilled in the art, e.g. gel permeation chromatography (GPC).

Copolymer A can be produced by well-known methods (DE-A 31 49 358 and DE-A 32 27 555), for example by well-known bulk, solution, suspension, or aqueous emulsion copolymerization at conventional temperatures in known apparatuses.

Further suitable in accordance with the invention as copolymer A are also α-methylstyrene-acrylonitrile copolymers, styrene-acrylonitrile-maleic anhydride copolymers, styrene-acrylonitrile-phenylmaleimide copolymers, α-methylstyrene-acrylonitrile-methyl methacrylate copolymers, α-methylstyrene-acrylonitrile-tert-butyl methacrylate copolymers, and styrene-acrylonitrile-tert-butyl methacrylate copolymers.

Component C

Graft copolymer C is different from graft copolymer B. Graft copolymer C is composed of an elastomeric, crosslinked acrylate polymer C1 (=graft base C1) and at least one graft shell C2, which is obtained via emulsion polymerization in the presence of at least one graft base C1, which graft shell C2 is made of a mixture comprising (consisting of) at least one vinylaromatic monomer C2-1 and at least one nitrile monomer C2-2.

Preferably graft copolymer C is composed of
- C1: 50 to 80 wt.-%, preferably 60 to 70 wt.-%, based on C, of graft base C1, an elastomeric, crosslinked acrylate polymer C1;
- C2: 20 to 50 wt.-%, preferably 30 to 40 wt.-%, based on C, of at least one graft shell C2, which is obtained via emulsion polymerization in the presence of at least one graft base C1, which graft shell C2 is made of a mixture comprising (consisting of) at least one vinylaromatic monomer C2-1 and at least one nitrile monomer C2-2, where the amount of C2-2, based on the total amount of C2, is 20 to 35 wt.-%, preferably 22 to 30 wt.-%.

More preferably graft copolymer C is composed of
- C1: 50 to 80 wt.-%, preferably 60 to 70 wt.-%, based on C, of at least one graft base C1, an elastomeric, crosslinked acrylate polymer C1, made from 95 to 99.9 wt.-%, preferably 97.5 to 99.9 wt.-%, of at least one C2-C8-alkyl acrylate, preferably C2-C4-alkyl acrylate, more preferably butyl acrylate, and from 0.1 to 5 wt.-%, preferably 0.1 to 2.5 wt.-%, of at least one crosslinking bi- or polyfunctional comonomer having at least two olefinic double bonds, in particular DCPA and/or AMA;
- C2: 20 to 50 wt.-%, preferably 30 to 40 wt.-%, based on C, of at least one graft shell C2, which is obtained via emulsion polymerization in the presence of at least one graft base C1, which graft shell is made of a mixture of comprising (consisting of) at least one vinylaromatic monomer, in particular styrene, C2-1 and at least one nitrile monomer, in particular acrylonitrile, C2-2, where the amount of C2-2, based on the total amount of C2, is 20 to 35 wt.-%, preferably 22 to 30 wt.-%.

According to a first embodiment the afore-mentioned graft copolymer C has one graft shell C2 consisting of only one layer (=single layer) made of a mixture comprising (consisting of) at least one vinylaromatic monomer, in particular styrene, C2-1 and at least one nitrile monomer, in particular acrylonitrile, C2-2. According to this first embodiment the weight average particle diameter $d_w$ of the graft base C1 can be within wide ranges such as 60 to 700 nm, often in the range of from 80 to 550 nm, preferably 300 to 700 nm, more preferably 350 to 550 nm.

Graft copolymers C according to this first embodiment and their preparation are known and described in the prior art (e.g. EP-A 0006503).

According to a second embodiment the afore-mentioned graft copolymer C has one graft shell C2 consisting of a first layer C21 made from at least one vinylaromatic monomer, in particular styrene, and a second layer C22 made of a mixture comprising (consisting of) at least one vinylaromatic monomer, in particular styrene, C22-1, and at least one nitrile monomer, in particular acrylonitrile, C22-2, where the amount of C22-2, based on the total amount of C22, is 20 to 35 wt.-%, preferably 22 to 30 wt.-%, and wherein the weight average particle diameter $d_w$ of the graft base C1 is in the range of from 300 to 700 nm, preferably 350 to 650 nm, more preferably 400 to 600 nm.

Preferably the fraction of the first layer C21—based on the total amount of C2—is more than 30 wt.-%.

Graft copolymers C according to this second embodiment and their preparation are known and described in the prior art (e.g. US 2016/0297957 A1, graft copolymer B).

Suitable acrylates c11 which can be used for the preparation of the graft base polymer C1 are C2-C8-alkyl acrylates. Up to 30 wt.-%, preferably up to 20 wt.-%, more preferably up to 10 wt.-% of the acrylate monomers c11 may be partially replaced by comonomers c12 as mentioned for b12 above.

Elastomeric, crosslinked acrylate polymer C1 (=graft base C1) is preferably made of from 95 to 99.9 wt.-%, preferably 97.5 to 99.9 wt.-5, of at least one C2-C8-alkyl acrylate, preferably C2-C4-alkyl acrylate, more preferably butyl acrylate, and from 0.1 to 5 wt.-%, preferably 0.1 to 2.5 wt.-%, of at least one crosslinking bi- or polyfunctional comonomer having at least two olefinic double bonds, in particular DCPA and/or AMA.

The alcohol component of the C2-C8-alkyl acrylate can be of linear or branched structure, a linear structure is preferred.

Particularly suitable are C2-C8-alkyl acrylates, in particular ethyl acrylate, 2-ethylhexyl acrylate, and n-butyl acrylate. Preference is given to 2-ethylhexyl acrylate and n-butyl acrylate, and very particular preference is given to n-butyl acrylate. It is also possible to use a mixture of various C2-C8-alkyl(meth)acrylates differing in their alkyl radical. Preferably one C2-C8-alkyl acrylate, more preferably one C2-C4-alkyl acrylate, most preferably n-butyl acrylate is used.

The rubbery graft base C1 moreover comprises at least one crosslinking monomer. Such monomers are bi- or polyfunctional comonomers as described above for graft base B1. Particular preference is given to DCPA and also to AMA. The crosslinking comonomer, in particular DCPA, is often used in amounts of from 0.1 to 5 wt.-%, preferably 0.1 to 2.5 wt.-%, based on B1. It is possible to use two crosslinking agents, but preferable to use only one.

Component D

The molding composition of the invention may optionally comprise additives and/or auxiliaries (processing aids) D such as stabilizers, oxidation retarders, agents to counter thermal decomposition and decomposition due to ultraviolet light, lubricants and mold release agents, colorants such as dyes and pigments, fibrous and pulverulent fillers and reinforcing agents, nucleating agents, plasticizers, etc.; the fraction thereof being in general not more than 20 wt.-%, preferably not more than 10 wt.-%, more preferably not more than 5 wt.-%.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt %, based on the weight of the thermoplastic molding composition.

UV stabilizers, used generally in amounts of up to 2 wt %, based on the molding composition, include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents.

Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 20 wt %, preferably up to 10 wt %.

Examples of nucleating agents that can be used are talc, calcium chloride, sodium phenylphosphinate, aluminum oxide, silicon dioxide, and nylon 22.

Examples of lubricants and mold release agents, which can be used in general in amounts up to 1 wt %, are long-chain fatty acids such as stearic acid or behenic acid, their salts (e.g., Ca or Zn stearate) or esters (e.g., stearyl stearate or pentaerythrityl tetrastearate), and also amide derivatives (e.g., ethylenebisstearylamide). For better processing, mineral-based antiblocking agents may be added in amounts up to 0.1 wt % to the molding compositions of the invention. Examples include amorphous or crystalline silica, calcium carbonate, or aluminum silicate.

Processing aids which can be used are, for example, mineral oil, preferably medical white oil, in amounts up to 5 wt %, preferably up to 2 wt %.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide. For further improving the resistance to inflammation, it is possible to add all of the flame retardants known for the thermoplastics in question, more particularly those flame retardants based on phosphorus compounds and/or on red phosphorus itself.

Component E

The molding composition of the invention may further comprise at least one further polymer E selected from aromatic polycarbonates and polyamides.

Suitable aromatic polycarbonates are known per se. They are obtainable, for example, in accordance with the processes of DE-B-1 300 266, by interfacial polycondensation, or the process of DE-A 14 95 730, by reaction of biphenyl carbonate with bisphenols. A preferred bisphenol is 2,2-di (4-hydroxyphenyl)propane, referred to generally—and also below—as bisphenol A.

In place of bisphenol A it is also possible to use other aromatic dihydroxy compounds, especially 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxybiphenyl, and also mixtures of the aforesaid dihydroxy compounds.

Particularly preferred polycarbonates are those based on bisphenol A or bisphenol A together with up to 30 mol % of the aforementioned aromatic dihydroxy compounds.

The relative viscosity of these polycarbonates is generally in the range from 1.1 to 1.5, more particularly 1.28 to 1.4 (noted at 25° C. in a 0.5 wt % strength solution in dichloromethane).

Partially crystalline, preferably linear polyamides such as polyamide 6, polyamide 6,6, polyamide 4,6, polyamide 6,12, and partially crystalline copolyamides based on these components are suitable. It is further possible to use partially crystalline polyamides whose acid component consists wholly or partly of adipic acid and/or terephthalic acid and/or isophthalic acid and/or suberic acid and/or sebacic acid and/or azelaic acid and/or dodecanedicarboxylic acid and/or a cyclohexanedicarboxylic acid, and whose diamine component consists wholly or partly in particular of m- and/or p-xylylenediamine and/or hexamethylenediamine and/or 2,2,4- and/or 2,4,4-trimethylhexamethylenediamine and/or isophoronediamine, and whose compositions are known in principle (cf. Encyclopedia of Polymers, vol. 11, p. 315 ff.).

The molecular weight Mn (number average) of the polyamides suitable as component B are preferably in the range between 5000 and 100 000, more preferably between 10 000 and 80 000.

Suitability is possessed by partially crystalline linear polyamides, for example, having a relative viscosity of 2.2 to 4.5, measured in 0.5% strength solution (0.5 g/100 ml) in 96 wt % strength sulfuric acid at 25° C. Preferred polyamides are those deriving wholly or partly from lactams having 7 to 13 ring members, such as polycaprolactam, poly-caprylyllactam or polyurolactam.

Further suitable are polyamides obtained by reacting dicarboxylic acids with one or more diamines. Examples of suitable dicarboxylic acids are alkanedicarboxylic acids having 6 to 12, especially 6 to 10, carbon atoms, especially adipic acid. Examples of suitable diamines are alkane- or cycloalkanediamines having 4 to 12, especially 4 to 8, carbon atoms; hexamethylenediamine, m-xylylenediamine, bis(4-aminophenyl)-methane, bis(4-aminocyclohexyl)methane or 2,2-bis(4-aminophenyl)propane, or mixtures thereof, are particularly suitable partners for preparing such polyamides. It may be advantageous to prepare the stated polyamides per se and to use mixtures thereof.

Of particular technical significance are polyamide 6 (polycaprolactam), polyamide 6,6 (polyhexamethyleneadipamide), and polyamides composed of at least 80 wt % of re-peating units of the formula—-[—NH—(CH2)4—NH—CO—(CH2)4-CO—)—. The last-mentioned polyamides are obtainable by condensing 1,4-diaminobutane with adipic acid. Suitable preparation processes for polyamides are described for example in EP-A 38 094, EP-A 38 582, and EP-A 39 524.

Likewise suitable are polyamides with a small fraction, preferably up to about 10 wt %, of other cocondensable constituents, especially other amide formers such as, for example, a,w-amino acids or N-carboxylic anhydrides (Leuchs anhydrides) of amino acids.

The molding compositions of the invention may further comprise as component E a partially aromatic copolyamide with the construction described below.

Preferred partially aromatic copolyamides E contain 40 to 90 wt % of units deriving from terephthalic acid and hexamethylenediamine. A small fraction of the terephthalic acid, preferably not more than 10 wt % of the total amount of aromatic dicarboxylic acids used, may be replaced by isophthalic acid or other aromatic dicarboxylic acids, preferably those in which the carboxyl groups are in para position.

Besides the units deriving from terephthalic acid and hexamethylenediamine, the partially aromatic copolyamides contain units which derive from ε-caprolactam and/or units which derive from adipic acid and hexamethylenediamine. The fraction of units deriving from ε-caprolactam is up to 50 wt %, preferably 20 to 50 wt %, especially 25 to 40 wt %, while the fraction of units deriving from adipic acid and hexamethylenediamine is up to 60 wt %, preferably 30 to 60 wt %, and especially 35 to 55 wt %.

The copolyamides may also contain both units of ε-caprolactam and units of adipic acid and hexamethylenediamine; in this case, the fraction of units which are free from aromatic groups is preferably at least 10 wt %, more preferably at least 20 wt %. The ratio of the units deriving from e-caprolactam and from adipic acid and hexamethylenediamine is not subject to any particular restriction here.

The melting point of particularly suitable partially aromatic copolyamides is situated for example in the range from 260 to more than 300° C., this high melting point also being associated with a high glass transition temperature of generally more than 75° C., especially more than 85° C. Binary copolyamides based on terephthalic acid, hexamethylenediamine, and ε-caprolactam, for a content of about 70 wt % of units deriving from terephthalic acid and hexamethylenediamine, have a melting point in the range of 300° C. and a glass transition temperature of more than 110° C. Binary copolyamides based on terephthalic acid, adipic acid, and hexamethylenediamine reach a melting point of 300° C. or more at a level of just about 55 wt % of units of terephthalic acid and hexamethylenediamine, with the glass transition temperature being not quite as high as for binary copolyamides which comprise ε-caprolactam in place of adipic acid or adipic acid/hexamethylenediamine.

Suitable partially aromatic copolyamides can be prepared by the processes described in EP-A 129 195 and EP-A 129 196.

Preparation of the Thermoplastic Molding Composition

The thermoplastic molding compositions of the invention may be produced from components A and B (and optionally further components C, D and/or E) by all known methods.

The graft polymers B are mixed with the copolymer A and, where present, with the further components C, D and/or E in a mixing apparatus, producing a substantially liquid-melt polymer mixture. "Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components A and B, and—where included—C, D and/or E may be mixed, for example, by joint extrusion, kneading, or rolling, the aforementioned components necessarily having been isolated from the aqueous dispersion or from the aqueous solution obtained in the polymerization.

Where one or more components in the form of an aqueous dispersion or of an aqueous or nonaqueous solution are mixed in, the water and/or the solvent is removed from the mixing apparatus, preferably an extruder, via a degassing unit.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated. The temperature is guided by the chemical and physical properties of components A and B and—when present—C, D and/or E, and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 160 to 400, preferably 180 to 300° C., more preferably 220 to 250° C.

In one preferred embodiment the mixing of the graft polymer B and—if present—graft copolymer C—with the copolymer A and, where included, with the further components D and/or E takes place in an extruder, with the dispersion of the graft polymer B and—if present-graft copolymer C, being metered directly into the extruder, without prior removal of the dispersion water. The water is customarily removed along the extruder via suitable degassing facilities. Degassing facilities used may be, for example, degassing vents which are provided with retention screws (preventing the emergence of the polymer mixture).

In another, likewise preferred embodiment, the mixing of the aforementioned components takes place in an extruder, with the graft polymer B, and if present graft copolymer C, being separated beforehand from the dispersion water. As a result of this prior removal of the dispersion water, water-moist graft polymers B (and optionally graft polymers C) are obtained which have a residual water content of up to 60 wt %, based on B (or C). The residual water present may then be removed in vapor form as described above via degassing facilities in the extruder. With particular preference, however, the residual water in the extruder is not removed solely as steam; instead, a part of the residual water is removed mechanically in the extruder and leaves the extruder in the liquid phase. In the case of this so-called squeeze method (EP-B 0 993 476, pp. 13-16), the same extruder is supplied with the copolymer A and—where present—components D and/or E, meaning that the product of the method extruded is the completed molding composition.

The graft copolymers B according to the invention and in particular molding compositions according to the invention provide excellent impact strength and often good UV resistance making them valuable raw materials for numerous applications. The invention further provides shaped articles produced from the polymer molding compositions of the invention. The thermoplastic molding compositions of the invention can by way of example be pelletized or granulated, or processed to give shaped articles of any type, for example cable sheathing, films, hoses, fibers, profiles, shoe shells, technical moldings (such as motor vehicle parts), consumer items, and coatings, for example by extrusion, injection molding, blow molding or calendering.

A further subject of the invention is the use of graft copolymers B according to the invention and in particular the use of thermoplastic molding compositions according to the invention in the automotive industry, for building and construction, toys and leisure.

The invention is further illustrated by the examples and claims.

EXAMPLES

Component A-1:
Poly-(styrene-co-acrylonitrile) having an acrylonitrile content of 33 wt.-% and a viscosity number of 80 ml/g.
Synthesis of Graft Copolymer B
Seed Latex S-B1-1:
The reaction vessel is charged with 90.2 parts of demineralized water, 0.61 parts of the sodium salt of a C12- to C18-paraffin sulfonic acid and 0.23 parts sodium bicarbonate. When the temperature in the reaction vessel reaches 59° C. 0.18 parts of potassium persulfate, dissolved in 5 parts of demineralized water, are added. A mixture of 59.51 parts butyl acrylate and 1.21 parts tricyclodecenylacrylate is added within a period of 210 min. Afterwards the reaction is continued for 60 min. Finally the polymer dispersion has a total solid content of 39.6% and the latex particles have a particle diameter dw of 75 nm (determined by turbidity as described above).

Basic Rubber Latex (=Graft Base) B1-1:
The reaction vessel is charged with 70.66 parts of demineralized water, 1.33 parts of seed latex S-B1-1 and 0.23 parts of sodium bicarbonate. After heating the reaction vessel to 60° C., 0.18 parts of potassium persulfate, dissolved in 5 parts demineralized water, are added to the reaction mixture. A mixture of 59.51 parts butyl acrylate and 1.21 parts tricyclodecenylacrylate is added within a period of 210 min. In parallel to the first feed a solution of 0.36 parts of the sodium salt of a C12- to C18-paraffin sulfonic acid in 16.6 parts demineralized water is also added over a period of 210 min. After 200 min, from starting the feed, the temperature is ramped to 65° C. Afterwards the reaction is continued for 60 min at 65° C. Finally the polymer dispersion has a total solid content of 39.5 to 42.55% and the latex particles have a particle diameter dw of 259 to 271 nm (determined by turbidity as described above).

The material was produced in different batches, resulting in small deviations for particle size and total solid content.

Basic Rubber Latex (=Graft Base) B1-2:
The reaction vessel is charged with 70.66 parts of demineralized water, 0.3 parts of seed latex S-B1-1 and 0.23 parts of sodium bicarbonate.

After heating the reaction vessel to 60° C., 0.18 parts of potassium persulfate, dissolved in 5 parts demineralized water, are added to the reaction mixture. A mixture of 59.51 parts butyl acrylate and 1.21 parts tricyclodecenylacrylate is added within a period of 210 min. In parallel to the first feed a solution of 0.36 parts of the sodium salt of a C12- to C18-paraffin sulfonic acid in 16.6 parts demineralized water is also added over a period of 210 min. After 200 min, from starting the feed, the temperature is ramped to 65° C. Afterwards the reaction is continued for 60 min at 65° C. Finally the polymer dispersion has a total solid content of 38.69 to 39.31% and the latex particles have a particle diameter dw of 418 to 426 nm (determined by turbidity as described above). The material was produced in different batches, resulting in small deviations for particle size and total solid content.

Component B-1:
An amount of 155.27 parts of the basic latex B1-1 (total solid content: 39.05%, particle size: 267 nm) is added to the reaction vessel together with 88.3 parts of demineralized water, 0.17 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 7.5 parts styrene and 2.5 parts acrylonitrile are added simultaneously at a temperature of 61° C., followed by a post polymerization time of 30 min, where the temperature is increased from 61 to 65° C. Then a mixture of 22.5 parts styrene and 7.5 parts acrylonitrile are added to the reaction over a period of 180 min. The reaction is continued at 65° C. for another 90 min. A polymer dispersion with a total solid content of 35.2% is obtained. The latex particles B-1 have a diameter dw 314 nm (determined by turbidity as described above).

Component B-2:

An amount of 154 parts of the basic latex B1-2 (total solid content: 39.31%, particle size: 426 nm) is added to the reaction vessel together with 88.29 parts of demineralized water, 0.10 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 7.5 parts styrene and 2.5 parts acrylonitrile are added simultaneously at a temperature of 61° C., followed by a post polymerization time of 30 min, where the temperature is increased from 61 to 65° C. Then a mixture of 22.5 parts of styrene and 7.5 parts of acrylonitrile are added to the reaction over a period of 180 min. The reaction is continued at 65° C. for another 90 min. A polymer dispersion with a total solid content of 35.2% is obtained. The latex particles B-2 have a diameter dw 502 nm (determined by turbidity as described above).

Component B-3:

An amount of 155.27 parts of the basic latex B1-1 (total solid content: 41.24%, particle size: 259 nm) is added to the reaction vessel together with 88.3 parts of demineralized water, 0.17 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 4 parts styrene are added at a temperature of 61° C., followed by a post polymerization time of 30 min, where the temperature is increased from 61 to 65° C. Then a mixture of 27 parts of styrene and 9 parts of acrylonitrile are added to the reaction over a period of 180 min. The reaction is continued at 65° C. for another 90 min. A polymer dispersion with a total solid content of 36.22% is obtained. The latex particles B-3 have a diameter dw 318 nm (determined by turbidity as described above).

Component B-4:

An amount of 155.27 parts of the basic latex B1-1 (total solid content: 42.12%, particle size: 271 nm) is added to the reaction vessel together with 88.3 parts of demineralized water, 0.17 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 6 parts styrene are added at a temperature of 61° C., followed by a post polymerization time of 30 min, where the temperature is increased from 61 to 65° C. Then a mixture of 25.5 parts of styrene and 8.5 parts of acrylonitrile are added to the reaction over a period of 180 min. The reaction is continued at 65° C. for another 90 min. A polymer dispersion with a total solid content of 36.79% is obtained. The latex particles B-4 have a diameter dw 315 nm (determined by turbidity as described above).

Component B-5:

An amount of 155.27 parts of the basic latex B1-1 (total solid content: 42.32%, particle size: 270 nm) is added to the reaction vessel together with 88.3 parts of demineralized water, 0.17 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 8 parts styrene are added at a temperature of 61° C., followed by a post polymerization time of 30 min, where the temperature is increased from 61 to 65° C. Then a mixture of 24 parts of styrene and 8 parts of acrylonitrile are added to the reaction over a period of 180 min. The reaction is continued at 65° C. for another 90 min.

A polymer dispersion with a total solid content of 36.81% is obtained. The latex particles B-5 have a diameter dw 330 nm (determined by turbidity as described above).

Component B-6:

An amount of 154 parts of the basic latex B1-2 (total solid content: 38.69%, particle size: 426 nm) is added to the reaction vessel together with 88.29 parts of demineralized water, 0.10 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 8 parts styrene are added at a temperature of 61° C., followed by a post polymerization time of 30 min, where the temperature is increased from 61 to 65° C. Then a mixture of 24 parts of styrene and 8 parts of acrylonitrile are added to the reaction over a period of 180 min. The reaction is continued at 65° C. for another 90 min. A polymer dispersion with a total solid content of 34.96% is obtained. The latex particles B-6 have a diameter dw 505 nm (determined by turbidity as described above).

Component B-7:

An amount of 155.27 parts of the basic latex B1-1 (total solid content: 42.55%, particle size: 267 nm) is added to the reaction vessel together with 88.3 parts of demineralized water, 0.17 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 10 parts styrene are added at a temperature of 61° C., followed by a post polymerization time of 30 min, where the temperature is increased from 61 to 65° C. Then a mixture of 22.50 parts of styrene and 7.5 parts of acrylonitrile are added to the reaction over a period of 180 min. The reaction is continued at 65° C. for another 90 min. A polymer dispersion with a total solid content of 36.79% is obtained. The latex particles B-8 have a diameter dw 319 nm (determined by turbidity as described above).

Component B-8:

An amount of 154 parts of the basic latex B1-2 (total solid content: 38.95%, particle size: 413 nm) is added to the reaction vessel together with 88.29 parts of demineralized water, 0.10 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 4 parts styrene are added at a temperature of 61° C., followed by a post polymerization time of 30 min, where the temperature is increased from 61 to 65° C. Then a mixture of 27 parts of styrene and 9 parts of acrylonitrile are added to the reaction over a period of 180 min.

The reaction is continued at 65° C. for another 90 min. A polymer dispersion with a total solid content of 35.03% is obtained. The latex particles B-9 have a diameter dw 499 nm (determined by turbidity as described above).

Component B-9:

An amount of 154 parts of the basic latex B1-2 (total solid content: 38.83%, particle size: 418 nm) is added to the reaction vessel together with 88.29 parts of demineralized water, 0.10 parts of the sodium salt of a C12- to C18-paraffin sulfonic acid and 0.16 parts of potassium persulfate, dissolved in 5.61 parts of demineralized water. The reaction mixture is heated to 61° C. Within a period of 60 min 10 parts styrene are added at a temperature of 61° C., followed by a post polymerization time of 30 min, where the temperature is increased from 61 to 65° C. Then a mixture of 22.5 parts of styrene and 7.5 parts of acrylonitrile are added to the reaction over a period of 180 min. The reaction is continued at 65° C. for another 90 min. A polymer dispersion with a total solid content of 35.16% is obtained. The latex particles B-10 have a diameter dw 521 nm (determined by turbidity as described above).

Precipitation/Drying 875 g of a MgSO4 solution (19.9 wt.-%) is mixed with 21214 g demineralized water. 4418 g of this solution is used as pre-charge and heated to 88° C. 9000 g of the polymer latex of graft copolymer B and 17671 g of the remaining diluted MgSO4 solution are added separately within 10 min, while the temperature is kept at 88° C. Then the resulting mixture is heated to 99° C. for 5 min. The resulting slurry is filtered off, washed two times with 20000 g of demineralized water and dried in a lab oven at 70° C. for 2 days.

Compounding/Testing

All presented examples were prepared by compounding components A and B using a twin screw extruder (Process 11, Thermo Fisher, 11 mm screws, 40 L/D, screw speed 220 rpm) at a temperature gradient of 220 to 250° C. according to the specific ratios given in Table 1 and Table 2. Prior to compounding the raw materials have been dried at 80° C. under vacuum for 8 h. Specimens for impact testing have been prepared via injection molding (Engel E-Max, dye temp. 270° C.). Impact strength was tested acc. to ISO 179/1eA (2010); Circular Saw Mutronic Diadisc 6200 for V notch, Impact pendulum Zwick/Roell RKP 5113 (50 J hammer), 10 samples per material tested.

Test Results

Examples 1 to 3 have been prepared using ASA graft rubbers having two graft layers (first styrene layer B21 accounts for 10 to 20 wt.-% of the total graft shell B2) and a particle size of 315 to 330 nm. Comparative examples 1 (311 nm) and 2 (502 nm) have been prepared from rubbers with only one (SAN) graft layer B2.

In both cases the acrylonitrile content of the SAN graft layer is 25 wt.-%. It can be clearly seen from Table 1 that a two-layered graft shell is beneficial for achieving high impact strength.

TABLE 1

Comparison of (comparative) graft copolymers B' having only one graft shell with graft copolymers B having to two graft layers B21 and B22

| Component (wt.-%) | Comp. Ex. 1 | Comp. Ex. 2 | Ex. 1 | Ex. 2 | Ex. 3 | Ex. 4 |
|---|---|---|---|---|---|---|
| A-1 | 60 | 60 | 60 | 60 | 60 | 60 |
| B-1 | 40 | | | | | |
| B-2 | | 40 | | | | |
| B-3 | | | 40 | | | |
| B-4 | | | | 40 | | |
| B-5 | | | | | 40 | |
| B-7 | | | | | | 40 |
| wt.-% B21 based on B21 + B22 | 0 | 0 | 10 | 15 | 20 | 25 |
| $d_w$ graft base B1 [nm] | 267 | 426 | 259 | 271 | 270 | 267 |
| $d_w$ graft copolymer B [nm] | 311 | 502 | 318 | 315 | 330 | 319 |
| ak [kJ/m²] IM 270° C. | 27 | 21 | 30 | 32 | 31 | 31 |

In Table 2 graft copolymers B and comparative graft copolymers B' both having a two-layered graft shell, but different particle size, are compared. The amounts of the components are given in wt.-%. It can be clearly seen that graft copolymers B prepared from a graft base B1 having a weight average particle size $d_w$ below 300 nm show significantly higher impact strength.

TABLE 2

Comparison between graft copolymers having a two-layered graft shell, but different particle size

| Component (wt.-%) | Ex. 1 | Ex. 3 | Ex. 4 | Comp. Ex. 4 | Comp. Ex. 3 | Comp. Ex. 5 |
|---|---|---|---|---|---|---|
| A-1 | 60 | 60 | 60 | 60 | 60 | 60 |
| B-3 | 40 | | | | | |
| B-6 | | | | | 40 | |
| B-5 | | 40 | | | | |
| B-7 | | | 40 | | | |
| B-8 | | | | 40 | | |
| B-9 | | | | | | 40 |
| $d_w$ graft base B1 [nm] | 259 | 270 | 267 | 419 | 426 | 418 |
| $d_w$ graft copolymer B [nm] | 318 | 330 | 319 | 499 | 505 | 521 |
| wt.-% B21 based on B21 + B22 | 10 | 20 | 25 | 10 | 20 | 25 |
| ak [kJ/m²] IM 270° C. | 30 | 31 | 31 | 22 | 22 | 23 |

The invention claimed is:

1. A graft copolymer B composed of:
   B1: 50 to 70 wt.-%, based on B, of at least one graft base B1 obtained by emulsion polymerization of the following monomers:
   i. b11: 70 to 99.9 wt.-%, based on B1, of at least one acrylate;
   ii. b12: 0 to 29.9 wt.-%, based on B1, of at least one further comonomer selected from: styrene, α-methylstyrene, acrylonitrile, methacrylonitrile, methylmethacrylate, and N-phenylmaleimide (N-PMI); and
   iii. b13: 0.1 to 10 wt.-%, based on B1, of one or more bi- or polyfunctional, crosslinking monomers;
   where the sum of b11, b12 and b13 adds up to 100 wt.-%; and
   B2: 30 to 50 wt.-%, based on B, of a graft shell B2, which is obtained via emulsion polymerization in the presence of at least one graft base B1, which graft shell B2 comprises a first layer B21 made of at least one vinylaromatic monomer, and a second layer B22 made of a mixture comprising at least one vinylaromatic monomer B21-1 and at least one nitrile monomer B22-2;
   where the sum of B1 and B2 adds up to 100 wt.-%;
   wherein:
   i. the weight average particle diameter $d_w$ of the graft base B1 is in the range of from 255 to 290 nm;
   ii. the fraction of B21, based on the total amount of B2, is 10 to 26 wt.-%; and
   iii. the amount of B22-2, based on the total amount of B22, is 20 to 30 wt.-%.

2. The graft copolymer B of claim 1, wherein the weight average particle diameter $d_w$ of the graft base B1 is in the range of from 260 to 285 nm.

3. The graft copolymer B of claim 1, wherein the fraction of B21, based on the total amount of B2, is 12 to 22 wt.-%.

4. The graft copolymer B of claim 1, wherein graft base B1 is made of monomers b11, b12, and b13 in the following amounts:
   b11: 75 to 99.5 wt.-%;
   b12: 0 to 20 wt.-%; and
   b13: 0.5 to 5 wt.-%.

5. The graft copolymer B of claim 1, wherein graft base B1 is obtained by emulsion polymerization of:
   b11: at least one C2-C8-alkyl acrylate; and
   b13: at least one bifunctional comonomer having two olefinic double bonds.

6. The graft copolymer B of claim 1, wherein graft shell B2 comprises a first layer B21 made of styrene, and a second layer B22 made of a mixture consisting of styrene B21-1 and acrylonitrile B22-2.

7. A process for the preparation of the graft copolymer B of claim 1,
comprising the following steps:
(i) first, production of a graft base B1 in the presence of a seed polymer latex (S-B1), wherein S-B1 has a weight average particle diameter dw of below that of the particles of the final graft base B1, by emulsion polymerization of the monomer b11, optionally the comonomer b12, and the crosslinking monomer b13 in an aqueous emulsion with a free-radical initiator at temperatures of from 30° to 120° C.; and
(ii) second, on the obtained graft base B1, in aqueous emulsion, in a first graft reaction (ii1) a first layer B21 of graft shell B2 is prepared by addition and polymerization of a vinyl aromatic monomer, and then, in a second graft reaction (ii2) a second layer B22 of graft shell B2 is prepared by addition and polymerization of monomers B22-1 and B22-2.

8. The process for the preparation of the graft copolymer B of claim 7, wherein the seed polymer latex (S-B1) is used in amounts of from 0.01 to 3 wt.-%, based on the total amount of monomer used for the preparation of graft base B1, and wherein the weight average particle diameter $d_w$ of S-B1 is less than 120 nm.

9. A thermoplastic molding composition comprising a polymer mixture PM comprising components A and B:
(A) 30 to 85 wt.-% of at least one thermoplastic copolymer A comprising at least one vinylaromatic monomer A1, and at least one nitrile monomer A2;
(B) 15 to 70 wt.-% of at least one graft copolymer B of claim 1;
where the sum of A and B adds up to 100 wt.-%.

10. The thermoplastic molding composition of claim 9, comprising further components C, D, and/or E:
40 to 100 wt.-% of a polymer mixture PM composed of components A and B;
0 to 30 wt.-% of at least one further graft copolymer C, different from graft copolymer B, composed of an elastomeric, crosslinked acrylate polymer C1 as graft base C1 and at least one graft shell C2, wherein the graft copolymer C is obtained via emulsion polymerization in the presence of at least one graft base C1, wherein graft shell C2 is made of a mixture comprising at least one vinylaromatic monomer C2-1 and at least one nitrile monomer C2-2;
0 to 20 wt.-% of additives and/or auxiliaries D; and
0 to 50 wt.-% of at least one further thermoplastic polymer E selected from aromatic polycarbonates and polyamides;
based in each case on the overall molding composition, and where the sum of PM, and components C, D, and/or E adds up to 100 wt.-%.

11. The thermoplastic molding composition of claim 9, wherein the proportion of the nitrile monomer A2, based on A, of thermoplastic copolymer A is from 20 to 35% by weight.

12. The thermoplastic molding composition of claim 10, wherein graft copolymer C has one graft shell C2 consisting of only one layer made of a mixture comprising at least one vinylaromatic monomer C2-1, and at least one nitrile monomer C2-2, where the amount of C2-2, based on the total amount of C2, is 20 to 35 wt.-%.

13. The thermoplastic molding composition of claim 10, wherein the graft shell C2 of graft copolymer C consists of a first layer C21 made from at least one vinylaromatic monomer, and a second layer C22 made of a mixture comprising at least one vinylaromatic monomer C22-1 and at least one nitrile monomer C22-2; where the amount of C22-2, based on the total amount of C22, is 20 to 35 wt.-%, and wherein the weight average particle diameter dw of the graft base C1 of graft copolymer C is in the range of from 300 to 700 nm.

14. The thermoplastic molding composition of claim 13, wherein the fraction of the first layer C21 of graft shell C2, based on the total amount of C21 and C22, is more than 30 wt.-%.

15. A process for the preparation of the thermoplastic molding composition of claim 10 by melt-mixing graft copolymer B with copolymer A and, where present, with the further components C, D, and/or E in a mixing apparatus.

16. A shaped article produced from the thermoplastic molding composition of claim 9.

17. An article comprising the graft copolymers of claim 1 for automotive industry, building and construction, toy, and/or leisure applications.

18. An article comprising the graft copolymers of the molding composition of claim 9 for automotive industry, building and construction, toy, and/or leisure applications.

* * * * *